United States Patent
Cheng et al.

(10) Patent No.: US 8,351,532 B2
(45) Date of Patent: Jan. 8, 2013

(54) ITERATIVE INTERFERENCE CANCELLATION

(75) Inventors: Fang-Chen Cheng, Randolph, NJ (US); Lei Song, Fremont, CA (US); Henry Hui Ye, Hong Kong (HK)

(73) Assignee: Alcatel Lucent, Paris (FR)

( * ) Notice: Subject to any disclaimer, the term of this patent is extended or adjusted under 35 U.S.C. 154(b) by 720 days.

(21) Appl. No.: 12/239,983

(22) Filed: Sep. 29, 2008

(65) Prior Publication Data

US 2009/0196370 A1 Aug. 6, 2009

Related U.S. Application Data

(60) Provisional application No. 60/997,115, filed on Oct. 1, 2007.

(51) Int. Cl.
*H04B 7/02* (2006.01)

(52) U.S. Cl. ........ 375/267; 375/136; 375/147; 375/148; 375/316; 375/260; 375/346; 375/347; 375/349

(58) Field of Classification Search ............ 375/148, 375/267, 136, 147, 260, 316, 347, 348, 349; 370/203, 204, 205, 206, 208, 209, 210, 342; 455/130, 296, 306

See application file for complete search history.

(56) References Cited

U.S. PATENT DOCUMENTS

| | | | | |
|---|---|---|---|---|
| 6,608,863 | B1 * | 8/2003 | Onizawa et al. | 375/232 |
| 7,408,975 | B2 * | 8/2008 | Bar-Ness et al. | 375/141 |
| 2004/0047403 | A1 * | 3/2004 | Choi et al. | 375/148 |
| 2005/0195889 | A1 * | 9/2005 | Grant et al. | 375/148 |
| 2006/0245509 | A1 * | 11/2006 | Khan et al. | 375/260 |
| 2007/0223423 | A1 * | 9/2007 | Kim et al. | 370/334 |
| 2008/0075195 | A1 * | 3/2008 | Pajukoski et al. | 375/298 |
| 2008/0090528 | A1 * | 4/2008 | Malladi | 455/70 |
| 2008/0152052 | A1 * | 6/2008 | Thomas | 375/346 |
| 2008/0200138 | A1 * | 8/2008 | Sipila | 455/226.2 |
| 2008/0267157 | A1 * | 10/2008 | Lee et al. | 370/342 |

* cited by examiner

*Primary Examiner* — Dhaval Patel
(74) *Attorney, Agent, or Firm* — Carlson, Gaskey & Olds PC

(57) ABSTRACT

An exemplary method of communicating includes determining a first user channel estimate from a communication comprising first and second user reference sequences. The first user reference sequence is reconstructed using the determined first user channel estimate. The communication is revised based upon the reconstructed first user reference sequence. Then determining a second user channel estimate is based on the revised communication.

39 Claims, 1 Drawing Sheet

Ｕ Ｓ ８,３５１,５３２ Ｂ ２

ITERATIVE INTERFERENCE CANCELLATION

CROSS REFERENCE TO RELATED APPLICATIONS

This application claims priority to U.S. Provisional Application No. 60/997,115 which was filed on Oct. 1, 2007.

FIELD OF THE INVENTION

This invention generally relates to communication. More particularly, this invention relates to multiple input multiple output (MIMO) wireless communications.

DESCRIPTION OF THE RELATED ART

Wireless communication systems are well known and in widespread use. Typical cellular communication arrangements include a plurality of base station transceivers strategically positioned to provide wireless communication coverage over selected geographic areas. A mobile station (e.g., notebook computer or cellular phone) communicates with a base station transceiver using an over-the-air interface.

There are various techniques that have been developed to increase system capacity and user features. For example, multiple input multiple output (MIMO) techniques allow a plurality of users to be communicating over one or more antennas simultaneously.

MIMO technology increases the data rate through transmission of parallel data streams on each antenna. A MIMO receiver needs to estimate the channel response from each transmitting antenna reliably to demodulate the mutually interfering signals. A reference sequence (e.g., pilot) allows for deriving channel estimation of the MIMO channel. The principle of the pilot sequence design for the MIMO technology is to minimize mutual interference. Orthogonal pilot sequences between the transmitted antennas minimize the mutual interference and enable reliable channel estimation from each transmitted antenna.

The possible orthogonal sequences are time division multiplexing (TDM), frequency division multiplexing (FDM), and code division multiplexing (CDM). The TDM and FDM pilot sequence techniques are limited to having a pilot sequence transmitted from one antenna and no transmission from the other antenna at the instance in time or frequency, respectively. The CDM technique allows for simultaneous transmission of the pilot from all antennas with orthogonal code sequence covering. The CDM pilot receiver therefore must separate the orthogonal code sequence for individual channel estimation of each transmitting antenna.

The 3GPP long term evolution (LTE) adopts the CDM type pilot for the uplink single carrier frequency domain multiple access (SC-FDMA) radio technology. LTE MIMO receivers therefore must be able to individually estimate each received channel. This is complicated by the interference introduced by the channel effects, which effectively render the orthogonal codes non-orthogonal.

Zadoff-Chu sequences are used as the orthogonal sequences of the CDM reference signal design in the LTE uplink. The root Zadoff-Chu sequences are orthogonal sequences. The shifts or offsets of any root Zadoff-Chu sequences are also a set of the orthogonal sequences. The offsets of the Zadoff-Chu sequences are considered in the LTE for physical uplink control channel (PUCCH), multi-user MIMO (MU-MIMO) technologies and sounding reference signal (SRS).

The generation of the base Zadoff-Chu sequence is as follows,

For the number of subcarriers $M_{sc}^{RS} \geq 36$, the sequence $r(0), \ldots, r(M_{sc}^{RS}-1)$ is given by $$r(n) = e^{j\alpha n} x_u((n+\theta) \bmod N_{ZC}^{RS}), 0 \leq n < M_{sc}^{RS}$$

where $\theta$ is an offset and the $u^{th}$ root Zadoff-Chu sequence is defined by $$x_u(m) = e^{-j\frac{\pi u m(m+1)}{N_{ZC}^{RS}}}, 0 \leq m \leq N_{ZC}^{RS} - 1$$

and the length $N_{ZC}^{RS}$ of the Zadoff-Chu sequence is given by the largest prime number such that $N_{ZC}^{RS} < M_{sc}^{RS}$. The factor corresponds to a cyclic shift in the time domain. For the number of subcarriers $M_{sc}^{RS} < 36$, the computer generating sequences are supported with properties similar to the short Zadoff-Chu sequences.

The allocation of the reference sequence (RS) in the LTE UL frame is at all subcarriers of the $4^{th}$ and $11^{th}$ symbols in each resource block (RB) for the physical uplink shared channel (PUSCH). The Zadoff-Chu sequences are mapped to each subcarrier in the frequency domain. For MU-MIMO, each user has one Zadoff-Chu sequence in the same RS location in the resource block.

The UL PUCCH, MU-MIMO and SRS receives the superposition of multi-user reference signals (RSs or Pilots), which are a pair of Zadoff-Chu sequences with relative offset. The Zadoff-Chu sequence has the shifting property of two offset sequences superposition in the frequency domain resulting in a time domain shift. The shifting property also applies at the multi-path fading channel condition. The generic algorithms for the MIMO pilot separation are to filter the unwanted shifting sequence. This could be achieved by transforming the pilot signals to the time domain to filter out the other reference sequences and transforming back to the frequency domain as known. The time domain filter is a simple multiplication of zero filling to cut off the undesired reference signals. The frequency and time domain transformation and the time domain filtering could be combined as the frequency domain filtering. The frequency domain filter coefficients are derived from the combination of DFT, time domain filtering and IDFT. The frequency domain filtering is a convolution of data and FIR filter. The frequency domain filtering technique could reduce the processing power by computing the frequency domain filter coefficients in advance and storing it for lookup. However, these filter coefficients will change subjective to the number of input data (length of Zadoff-Chu Sequence). The computational complexity of both methods is similar.

Such a filtering technique provides sufficient performance of CDM pilot separation for channel estimation of an individual transmitting antenna. However, the filtering effect introduces performance degradation at the edge of the RB since the data to convolve with the frequency domain filter is cut off at the edge. The performance degradation of the pilot separation is very sensitive when the reference sequence is short (e.g. 1 RB). In addition to the reduced quality when the number of received RBs is low, the known filtering technique is computationally complex.

SUMMARY

An exemplary method of communicating includes determining a first user channel estimate from a communication comprising first and second user reference sequences. The first user reference sequence is reconstructed using the determined first user channel estimate. The communication is revised based upon the reconstructed first user reference sequence. Then determining a second user channel estimate is based on the revised communication.

The reconstructed reference sequence is used as feedback for estimating the channel of the other user in a channel estimation technique that resembles single input single output channel estimation.

The various features and advantages of the disclosed examples will become apparent to those skilled in the art from the following detailed description. The drawings that accompany the detailed description can be briefly described as follows.

DETAILED DESCRIPTION

Figure 1:
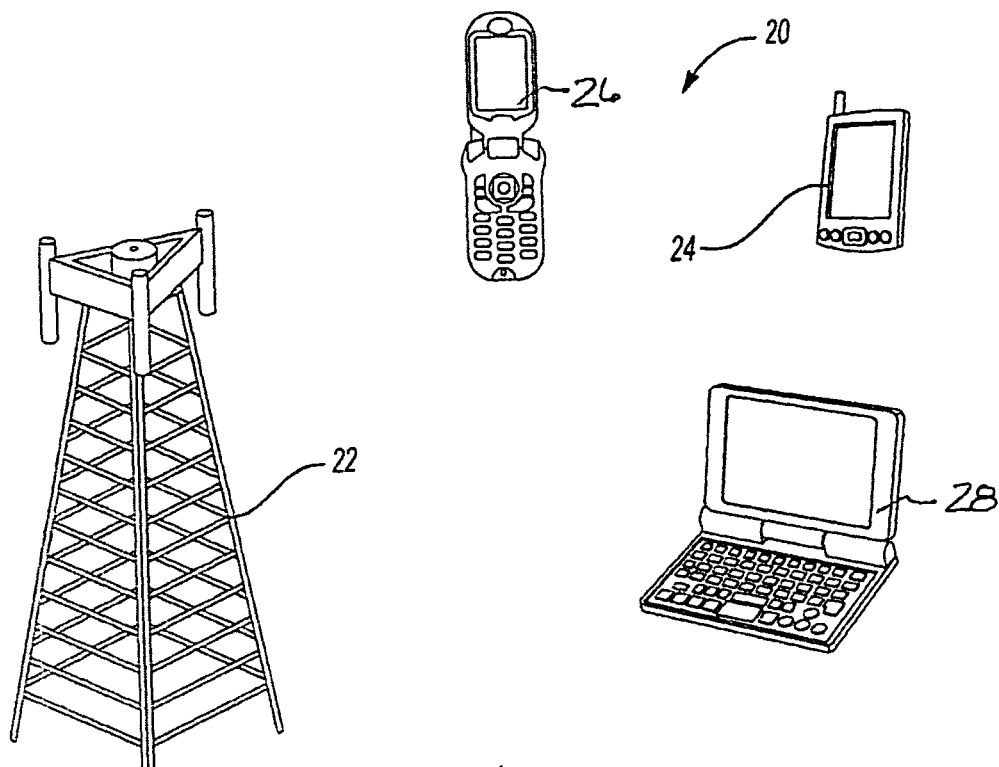
FIG. 1 schematically illustrates selected portions of a communication system designed according to an embodiment of this invention.

FIG. 1 shows selected portions of a wireless communication system 20. A base station 22 communicates with a plurality of mobile stations 24, 26 and 28.

The communications between the base station 22 and the mobile stations 24, 26 and 28 may include multiple user, multiple input multiple output (MU MIMO) or SRS communications. MIMO communications involve multiple transmitting antennas transmitting simultaneously. Orthogonal constant amplitude zero autocorrelation (CAZAC) sequences (e.g., Zadoff-Chu sequences) are assigned to the mobile stations, respectively. Such sequences allow for individually detecting the communication from each mobile station.

The base station 22 includes a channel estimation module for detecting each received channel from each user of a MIMO communication. The channel estimation module uses an iterative pilot interference cancellation (IPIC) scheme. The principle of the IPIC scheme for MU MIMO or SRS includes performing a noisy Single Input Single Output (SISO) frequency domain channel estimation for one user first with the other user as the interference source. The SISO frequency domain channel estimation is based on an average filtering process in one example. The output of the channel estimate for the one user is used to reconstruct the reference sequence of that one user by multiplying the channel estimate by the associated Zadoff-Chu sequence. The reconstructed reference sequence is then used as feedback for interference cancellation in the received communication. The output of the interference cancellation is used to perform the SISO frequency domain channel estimation for another user.

The process of estimating the channel, reconstructing the reference sequence and using that as feedback for interference cancellation is iteratively repeated until a desired number of iterations are complete or a desired accuracy is achieved. The channel estimation performance for MIMO or SRS improves each time when the other user's pilot interference is cancelled.

Figure 2:
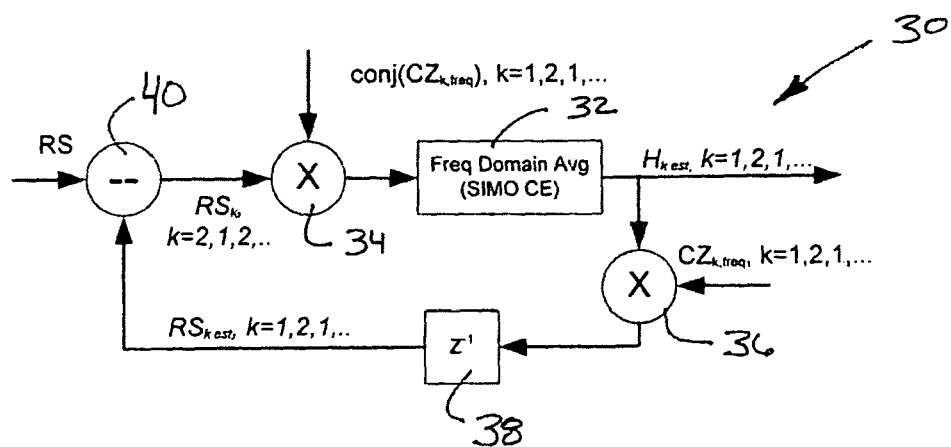
FIG. 2 schematically illustrates an example embodiment of a channel estimation module.

FIG. 2 schematically illustrates one example channel estimation module 30. This example includes a frequency domain averaging filter 32 that operates much like a SISO channel estimation filter. In one example, the filter 32 uses a simple averaging technique to provide a channel estimate.

A communication (RS) is received that includes a plurality of user reference sequences. For purposes of discussion a first user (k=1) and a second user (k=2) will be considered. A multiplier 34 multiplies the received signal by the complex conjugate of the CAZAC sequence assigned to the first user. The filter 32 filters the product from the multiplier 34 to determine a first user channel estimate ($H_{1,est}$).

Another multiplier 36 multiplies the just determined first user channel estimate by the CAZAC sequence of the first user to reconstruct the reference sequence of the first user. A delay is added to the reconstructed first user reference sequence at 38. The reconstructed first user reference sequence is feedback for interference cancellation at 40. In this example, the reconstructed first user reference sequence is subtracted from the received communication to revise the communication.

The revised communication is then provided to the multiplier 34 where it is multiplied by the complex conjugate of the second user CAZAC sequence. The product is then filtered by the filter 32 to determine a second user channel estimate.

The second user reference sequence is then reconstructed by the multiplier 36 and a delay is added at 38. The reconstructed second user reference sequence is then used as feedback for interference cancellation for revising the first user channel estimate. In this example, the reconstructed second user reference sequence is subtracted from the received communication to revise the communication. The revised communication is then multiplied by the complex conjugate of the first user CAZAC sequence in the multiplier 34. The product is then filtered to provide a revised first user channel estimate.

A revised reconstructed first user reference sequence is then determined by the multiplier 36 using the first user CAZAC sequence. The revised reconstructed first user reference sequence is then used as feedback for interference cancellation for revising the second user channel estimate. The process of revising each user channel estimate proceeds in this manner as many times as desired.

In one example, a preselected number of iterations is used. In some examples as few as two or three iterations are satisfactory. In another example, each revised channel estimate is compared to a previous channel estimate for the corresponding user and the iterative process is concluded when a selected amount of convergence is detected.

The computational complexity of the IPIC scheme is much lower than that of time or frequency domain filtering, which required FFT/DFT for time domain filtering or convolution for frequency domain filtering. The complexity of the IPIC scheme for the length N subcarriers corresponds to the linear multiplication of length N multiplied by the number of iterations. The time domain filtering, by comparison, requires a complexity on the order of N log N. The frequency filtering scheme, by comparison, has a computation complexity on the order of $N^2$.

The disclosed example IPIC scheme is useful for joint pilot separation and channel estimation for LTE CDM type reference signals, for example. The IPIC of the disclosed example provides better performance in channel estimation and no performance degradation of the edge effects that were otherwise present with other techniques. The example IPIC scheme also has less computational complexity in implementation, which increases the efficiencies and economies of a receiver.

The preceding description is exemplary rather than limiting in nature. Variations and modifications to the disclosed examples may become apparent to those skilled in the art that do not necessarily depart from the essence of this invention.

The scope of legal protection given to this invention can only be determined by studying the following claims.

We claim:

1. A method of communicating, comprising the steps of:
   (A) determining a first user channel estimate from a communication comprising first and second user constant amplitude zero autocorrelation (CAZAC) reference sequences by multiplying the communication by a complex conjugate of the CAZAC sequence assigned to the first user and filtering the product of the multiplying to thereby determine the first user channel estimate;
   (B) reconstructing the first user reference sequence by multiplying the determined first user channel estimate by the CAZAC sequence assigned to the first user;
   (C) revising the communication by subtracting the reconstructed first user reference sequence from the communication; and
   (D) determining a second user channel estimate from the revised communication by multiplying the communication by a complex conjugate of the CAZAC sequence assigned to the second user and filtering the product of the multiplying to thereby determine the second user channel estimate.

2. The method of claim 1, comprising
   (E) reconstructing the second user reference sequence by multiplying the determined second user channel estimate by the CAZAC sequence assigned to the second user;
   (F) revising the communication by subtracting the reconstructed second user reference sequence from the communication; and
   (G) revising the first user channel estimate from the revised communication.

3. The method of claim 2, comprising
   (H) revising the reconstructed first user reference sequence using the revised first user channel estimate;
   (I) revising the communication based upon the revised reconstructed first user reference sequence; and
   (J) revising the second user channel estimate from the revised communication.

4. The method of claim 3 comprising
   (K) revising the reconstructed second user reference sequence using the revised second user channel estimate; and
   iteratively, repeating steps (F) through (K).

5. The method of claim 4, comprising
   iteratively repeatedly performing steps (F) through (K) a selected number of times.

6. The method of claim 5, comprising
   determining the channel estimates using an averaging filter technique in a frequency domain.

7. The method of claim 1, wherein revising the communication comprises
   adding a delay to each reconstructed reference sequence; and
   subsequently subtracting the reconstructed reference sequence from the communication to thereby revise the communication.

8. The method of claim 1, wherein revising the communication comprises cancelling an effect of the reconstructed reference sequence from the communication.

9. The method of claim 1, wherein the communication comprises a multi-user multiple input multiple output communication.

10. The method of claim 9, wherein the communication comprises at least one resource block and the first and second user reference sequences are both within the at least one resource block.

11. The method of claim 1, comprising
    determining a first user reference signal or pilot a second user reference signal or pilot.

12. The method of claim 1, comprising
    determining the channel estimates using an averaging filter technique in a frequency domain.

13. A receiver device comprising
    a channel estimation module for at least estimating a channel of each of a plurality of users from which a communication is received simultaneously, the communication comprising first and second user constant amplitude zero autocorrelation (CAZAC) reference sequences, the channel estimation module being configured to
    determine a first user channel estimate from the communication by multiplying the communication by a complex conjugate of the CAZAC sequence assigned to the first user and filtering the product of the multiplying to thereby determine the first user channel estimate;
    reconstruct the first user reference sequence by multiplying the determined first user channel estimate by the CAZAC sequence assigned to the first user;
    revise the communication by subtracting the reconstructed first user reference sequence from the communication; and
    determine a second user channel estimate from the revised communication by multiplying the communication by a complex conjugate of the CAZAC sequence assigned to the second user and filtering the product of the multiplying to thereby determine the second user channel estimate.

14. The device of claim 13, wherein the channel estimation module is configured to
    reconstruct the second user reference sequence by multiplying the determined second user channel estimate by the CAZAC sequence assigned to the second user;
    revise the communication by subtracting the reconstructed second user reference sequence from the communication;
    revise the first user channel estimate from the revised communication;
    revise the reconstructed first user reference sequence using the revised first user channel estimate;
    revise the communication based upon the revised reconstructed first user reference sequence;
    revise the second user channel estimate from the revised communication;
    revise the reconstructed second user reference sequence using the revised second user channel estimate; and
    iteratively, repeatedly revise each channel estimate, the communication and each reconstructed reference sequence.

15. The device of claim 14, wherein the channel estimation module is configured to iteratively, repeatedly revise each channel estimate until a selected amount of convergence is achieved for the channel estimate of at least one of the user channels.

16. The method of claim 4, comprising
    iteratively repeatedly performing steps (F) through (K) until a selected amount of convergence is achieved for the channel estimate of at least one of the user channels.

17. The method of claim 1, wherein the reference sequences each comprises a Zadoff-Chu sequence.

18. The device of claim 13, wherein the reference sequences each comprises a Zadoff-Chu sequence.

19. A communication device, comprising:
user channel estimate means for determining a first user channel estimate from a communication comprising first and second user constant amplitude zero autoconelation (CAZAC) reference sequences by multiplying the communication by a complex conjugate of the CAZAC sequence assigned to the first user and filtering the product of the multiplying to thereby determine the first user channel estimate;
reconstructing means for reconstructing the first user reference sequence by multiplying the determined first user channel estimate by the CAZAC sequence assigned to the first user; and
revising means for revising the communication by subtracting the reconstructed first user reference sequence from the communication; and
the user channel estimate means also being for determining a second user channel estimate from the revised communication by multiplying the communication by a complex conjugate of the CAZAC sequence assigned to the second user and filtering the product of the multiplying to thereby determine the second user channel estimate.

20. The device of claim 19, wherein
the reconstructing means is also for reconstructing the second user reference sequence by multiplying the determined second user channel estimate by the CAZAC sequence assigned to the second user;
the revising means is also for revising the communication by subtracting the reconstructed second user reference sequence from the communication; and
the user channel estimate means is also for revising the first user channel estimate from the revised communication.

21. The device of claim 20, wherein
the reconstructing means is also for revising the reconstructed first user reference sequence using the revised first user channel estimate;
the revising means is also for revising the communication based upon the revised reconstructed first user reference sequence; and
the user channel estimate means is also for revising the second user channel estimate from the revised communication.

22. The device of claim 21, wherein the reconstructing means is also for revising the reconstructed second user reference sequence using the revised second user channel estimate.

23. The device of claim 19, wherein the user channel estimate means determines the channel estimates using an averaging filter technique in a frequency domain.

24. The device of claim 19, wherein the revising means revises each communication by
adding a delay to each reconstructed reference sequence; and
subsequently subtracting the reconstructed reference sequence from the communication to thereby revise the communication.

25. The device of claim 19, wherein the revising means cancels an effect of the reconstructed reference sequence from the communication.

26. The device of claim 19, wherein the communication comprises a multi-user multiple input multiple output communication.

27. The device of claim 19, wherein the communication comprises at least one resource block and the first and second user reference sequences are both within the at least one resource block.

28. The device of claim 19, comprising means for determining a first user reference signal or pilot and a second user reference signal or pilot.

29. The device of claim 19, wherein the reference sequences each comprise a Zadoff-Chu sequence.

30. A communication device, comprising:
a first multiplier configured to multiply a communication by a complex conjugate of a constant amplitude zero autocorrelation (CAZAC) reference sequence assigned to a user;
a filter configured to filter a product of the first multiplier;
a second multiplier configured to reconstruct a user reference signal by multiplying an output from the filter by the CAZAC sequence assigned to the user; and
a subtractor configured to revise a communication by subtracting a product of the second multiplier from the communication;
wherein
the first multiplier and the filter are configured to determine a first user channel estimate from a communication comprising first and second user CAZAC reference sequences by the first multiplier multiplying the communication by a complex conjugate of the first user CAZAC sequence assigned to a first user and the filter filtering the product of the first multiplier to determine the first user channel estimate;
the second multiplier is configured to reconstruct the first user CAZAC reference sequence by multiplying the determined first user channel estimate by the first user CAZAC sequence; and
the subtractor is configured to revise the communication by subtracting the reconstructed first user CAZAC reference sequence from the communication; and
the first multiplier and the filter are configured to determine a second user channel estimate by the first multiplier multiplying the communication, after its revision, by a complex conjugate of the second user CAZAC sequence assigned to a second user and the filter filtering the product of the first multiplier to determine the second user channel estimate.

31. The device of claim 30, wherein
the second multiplier is configured to reconstruct the second user CAZAC reference sequence by multiplying the determined second user channel estimate by the second user CAZAC sequence;
the subtractor is configured to revise the communication by subtracting the reconstructed second user CAZAC reference sequence from the communication; and
the first multiplier and the filter are configured to revise the first user channel estimate from the communication after revision by the subtractor.

32. The device of claim 31, wherein
the second multiplier is configured to revise the reconstructed first user CAZAC reference sequence using the revised first user channel estimate;
the subtractor is configured to revise the communication based upon the revised reconstructed first user CAZAC reference sequence; and
the first multiplier and the filter are configured to revise the second user channel estimate from the communication after revision by the subtractor.

33. The device of claim 32, wherein the subtractor is configured to revise the reconstructed second user CAZAC reference sequence using the revised second user channel estimate.

34. The device of claim 30, wherein the filter is configured to use an averaging filter technique in a frequency domain.

35. The device of claim 30, wherein the subtractor is configured to revise each communication by adding a delay to each reconstructed reference sequence; and subsequently subtracting the reconstructed reference sequence from the communication to revise the communication.

36. The device of claim 30, wherein the subtractor is configured to cancel an effect of the reconstructed reference sequence from the communication.

37. The device of claim 30, wherein the communication comprises a multi-user multiple input multiple output communication.

38. The device of claim 30, wherein the communication comprises at least one resource block and the first and second user CAZAC reference sequences are both within the at least one resource block.

39. The device of claim 30, wherein the CAZAC reference sequences assigned to the first user and the second user each comprise a Zadoff-Chu sequence.

* * * * *